US010731115B2

(12) United States Patent
Warren et al.

(10) Patent No.: US 10,731,115 B2
(45) Date of Patent: Aug. 4, 2020

(54) METHODS OF MAKING UNIT-DOSE PRODUCTS WITH SUPERCOOLING

(71) Applicant: Henkel IP & Holding GmbH, Duesseldorf (DE)

(72) Inventors: Brian Alan Warren, Bowling Green, KY (US); M. Shawn French, Salt Lake City, UT (US); Edward R. Paulsen, Salt Lake City, UT (US); Troy H. Alvey, Salt Lake City, UT (US); Abey Cherian, Congers, NY (US); Montes Jose Ulibarri, West Jordan, UT (US); Janet Coope-Epstein, Trumbull, CT (US); Maxime Pelletier, Sandy Hook, CT (US)

(73) Assignee: Henkel IP & Holding GmbH (DE)

( * ) Notice: Subject to any disclaimer, the term of this patent is extended or adjusted under 35 U.S.C. 154(b) by 10 days.

(21) Appl. No.: 16/039,090

(22) Filed: Jul. 18, 2018

(65) Prior Publication Data

US 2019/0031983 A1 Jan. 31, 2019

Related U.S. Application Data

(60) Provisional application No. 62/538,103, filed on Jul. 28, 2017.

(51) Int. Cl.

*C11D 17/04* (2006.01)
*C11D 17/08* (2006.01)
(Continued)

(52) U.S. Cl.

CPC ............ *C11D 17/045* (2013.01); *C11D 11/00* (2013.01); *B65D 65/46* (2013.01)

(58) Field of Classification Search

None

See application file for complete search history.

(56) References Cited

U.S. PATENT DOCUMENTS

2002/0086806 A1 7/2002 Giblin et al.
2004/0144681 A1* 7/2004 Wiedemann ......... C11D 3/0052 206/524.7

(Continued)

FOREIGN PATENT DOCUMENTS

EP 3025848 A1 1/2016
EP 3025983 A1 1/2016

(Continued)

OTHER PUBLICATIONS

European Search Report Application No. 18183309.6-1105 Completed: Oct. 9, 2018; dated Oct. 16, 2018 7 pages.

*Primary Examiner* — Lorna M Douyon
(74) *Attorney, Agent, or Firm* — Bojuan Deng

(57) ABSTRACT

Disclosed is a method for producing a unit-dose capsule which includes optionally forming the first film into the shape of a first cavity, supercooling a first component to a temperature at which the equilibrium state of the first component is a gel, dispensing the first component in a supercooled state into the first cavity, such that the first component gels to form at least one layer of gel adhered to and/or in contact with the first film, forming a second film into the shape of a second cavity, filling the second cavity with a second component, sealing the first film to the second film to form a sealed cavity comprising at least one chamber containing the first component and the second component. The method may further include wetting and perforating the first film. The unit-dose capsule comprises the sealed container and the two components.

13 Claims, 21 Drawing Sheets

(51) Int. Cl.

| | |
|---|---|
| ***C11D 11/00*** | (2006.01) |
| ***B65D 65/46*** | (2006.01) |
| ***B29C 35/16*** | (2006.01) |

(56) References Cited

U.S. PATENT DOCUMENTS

| | | | | |
|---|---|---|---|---|
| 2012/0108487 A1* | 5/2012 | Graham | ............... | C11D 17/042 510/221 |
| 2016/0102279 A1* | 4/2016 | Labeque | ................ | C08K 5/053 510/296 |

FOREIGN PATENT DOCUMENTS

| | | | |
|---|---|---|---|
| WO | 0136290 | A1 | 5/2001 |
| WO | 2005121302 | A1 | 12/2005 |
| WO | 2006000309 | A1 | 1/2006 |
| WO | 2018089564 | A1 | 5/2018 |

* cited by examiner

METHODS OF MAKING UNIT-DOSE PRODUCTS WITH SUPERCOOLING

FIELD OF THE INVENTION

The invention is in the fields of household and industrial cleaning. More particularly, the invention relates to unit-dose products or pouches containing gels that may be used in household and industrial cleaners.

BACKGROUND

Many household and industrial cleaners include more than one cleaning component or element. For convenience, many of these cleaners are packaged as unit-dose detergent products. To improve effectiveness of the unit-dose detergent products, it may be necessary to keep the multiple components separate until the unit-dose detergent product is used for cleaning. Other advantages of unit-dose detergent products include convenience of use and dispensing, lower cost per use, and avoiding or minimizing direct skin contact the detergent itself.

SUMMARY

The present invention provides a method for producing a unit-dose capsule that includes at least at least one solid or semi-solid component.

According to some embodiments, the method comprises the steps of optionally forming a first film into the shape of a first cavity, providing a first component under a first condition that makes it fluid and/or flowable, dispensing the first component onto the first film or into the first cavity under a second condition such that the first component transforms to a solid or semi-solid state and forms a layer of component one adhered to and/or in contact with the first film after dispensing, forming a second film into the shape of a second cavity, filling the second cavity with a second component; and sealing the first and second films to form a sealed chamber comprising at least one chamber containing the first and the second component.

In preferred embodiments, the first component used in the above method is a gel; the second component is a powder; and the first condition is a supercooling condition. The above method may further include a step of wetting the first film before the dispensing step, and/or a step of perforating the first film.

According to other embodiments, the method includes wetting a first film, forming the first film into the shape of an first cavity of a multi-cavity design, supercooling a first component to a temperature at which the equilibrium state of the first component is a gel, dispensing the first component in a supercooled state into the first cavity, such that the first component gels to form at least one layer of gel adhered to and/or in contact with the first film, forming a second film into the shape of a second cavity of a multi-cavity design, filling the second cavity with a second component, sealing the first film to the second film to form a sealed container comprising at least one chamber containing the first component and the second component, wherein the first film has been perforate during the process to form perforations.

As would have been understood by a person of skilled in the art, the methods reciting the first and second cavities in a relative term and thus necessarily include the order of filling the second cavity prior to, or concurrently with filling the first cavity, wherein each of the cavities is formed by each of the respective first and second films. The methods also include a variation of the steps, wherein a layer of gel is adhered to and/or in contact with a second film in a second cavity, and wherein another component is filled in a first cavity formed by a first film, before the films are sealed to form a pouch. Such interpretation should apply to the entire disclosure of this application.

According to yet other embodiments, after having the first component gels adhered to and/or in contact with a film, a second component, such as powders, can be added to sit on the first gel component and fill in the first cavity. Another film is formed into the shape of a second cavity of a multi-cavity design. Optionally, a third component (e.g., a gel, a powder, or a liquid) is filled the second cavity. The first film is coupled to the second film to form a sealed container comprising at least one chamber containing the first and the second, and optional the third and/or fourth, components, and perforating the film that is adhere to or in contact with the gel to form perforations.

According to further embodiments, both of the first and the second films are attached to or in contact with at least one layer of gels. Other components (e.g., powder, gel, liquid) may be added to the first or the second cavity before the first and the second films are sealed to provide a sealed container. When more than one layer of gels is present in the sealed container, the layers of gels can be positioned side-by-side, stacked on top of each other, or be separated by other component(s).

In some embodiments, the multi-cavity design may include up to four cavities, each cavity may contain a different or same component (e.g., gel, powder, liquid) as in one of the other cavities. Thus, the unit-dose capsule may comprise the sealed container, the first component, the second component, and optionally a third component and/or a fourth component. At room temperature, at least the first component is a gel, and the first and second films are water soluble.

In some embodiments, the first film is perforated after sealing, the first film is not perforated in a first region defined by the at least one layer of gel, and the first film is perforated in a second region defined by the area of the first film that is 10 to 100 microns distant from the first region.

In some embodiments, the perforating a first film comprises laser perforation.

In some embodiments, the first component is dispensed into the first cavity after wetting the first film.

In some embodiments, when it is dispensed, the first component is supercooled to a temperature 5° F. to 50° F. below the freezing temperature of the gel.

In some embodiments, when it is dispensed, the first component is supercooled to a temperature 20° F. to 30° F. below the freezing temperature of the gel.

In some embodiments, wherein, when it is dispensed, the first component is supercooled to a temperature of 125° F. to 200° F.

In some embodiments, when it is dispensed, the first component is supercooled to a temperature of 140° F. to 160° F.

In some embodiments, the supercooling step is completed within 0.4 seconds to 0.8 seconds.

In some embodiments, the perforating the first film step is completed within 0.5 to 1.0 seconds following the dispensing step.

In some embodiments, the supercooling of the first component is performed in a votator.

As a result of the perforation which allows gases being flown out of the unit dose, there is no need to apply vacuum to the sealed container to draw gas out. Nevertheless, it is envisioned that a vacuum may be optionally applied to the sealed container to expedite drawing of gases out of the sealed container.

In some embodiments, the method further comprises forming a second layer of gel over the first layer of gel.

In some embodiments, the method further comprises forming a second layer of gel adjacent to the first layer of gel.

In some embodiments, the second layer of gel comprises a third component different from the first and second components.

In some embodiments, the unit-dose capsule is a consumer cleaning product.

In some embodiments, the method comprises a continuous process, for example, with a scrape wall heat exchanger (also known as a votator).

In some embodiments, the method comprises a semi-batch process.

In some embodiments, the method is performed in a scraped-wall kettle.

In some embodiments, the method comprises a batch process.

Some embodiments relate to a unit-dose capsule. The unit-dose capsule comprises a water-soluble cavity defining at least one compartment. The cavity comprises a first film adhered to and/or in contact with a second film and a cleaning system disposed in the compartment. The cleaning system comprises a first component comprising a gel adhered to and/or in contact with the first film and a second component. The first film is perforated.

In some embodiments, the second component comprises at least one of a solid powder, a liquid, or a gel.

In some embodiments, the water-soluble container comprises at least one chamber.

In some embodiments, the first component and the second component are layered.

In some embodiments, the first component and the second component are side by side.

In some embodiments, at least one of the solid gel and the first composition comprises a detersive surfactant.

In some embodiments, the gel is adhered to and/or in contact with the perforated film by a process comprising solidification of the gel from a supercooled liquid state onto the second film.

BRIEF DESCRIPTION OF THE FIGURES

FIGS. 1A and 1B show an exemplary unit-dose detergent composition in single-compartment sealed polyvinylalcohol (PVOH) pouch, containing single flat layered gel formulation layered on top of powder formulation, and demonstrating minimal or no penetration of gel layer into powder layer. FIG. 1B is a line drawing of FIG. 1A.

FIGS. 2A-2D show an exemplary unit-dose detergent compositions in single-compartment sealed polyvinylalcohol (PVOH) pouch, containing powder formulation layered on top of single contoured/shaped layered gel, and demonstrating minimal or no penetration of gel layer into powder layer. FIGS. 2C and 2D are line drawings of FIGS. 2A and 2B, respectively.

FIGS. 3A and 3B show an exemplary unit-dose detergent composition in single-compartment sealed polyvinylalcohol (PVOH) pouch, containing single flat layered gel formulation having two colors layered on top of powder formulation. FIG. 3B is a line drawing of FIG. 3A.

FIGS. 4A-4D show an exemplary unit-dose detergent composition in single-compartment sealed polyvinylalcohol (PVOH) pouch, containing powder formulation layered on top of multi-color (in this case, three-color) contoured/shaped layered gel, and demonstrating minimal or no penetration of gel layer into powder layer. FIG. 4A shows a top view of the pouch, and FIG. 4C shows a line drawing of FIG. 4A. FIG. 4B shows a side view of the pouch, and FIG. 4D shows a line drawing of FIG. 4B.

FIGS. 5A and 5B show an exemplary unit-dose detergent composition in single-compartment sealed polyvinylalcohol (PVOH) pouch, containing multiple layers of flat gel and powder (in this case, two alternating layers of each), and demonstrating minimal or no penetration of gel layer into powder layer.

(FIG. 7A: top-up; FIG. 7B: inverted) containing sequentially layered powder (white solid; bottom layer in FIG. 7A, top layer in FIG. 7B), gel (lighter solid middle layer in both FIGS. 7A and 7B) and liquid (dark layer; top layer in FIG. 7A, bottom layer in FIG. 7B) formulations in a single compartment, demonstrating the production of single-compartment unit-dose compositions of the invention containing powder, gel and liquid in separate layers of the single compartment by using the gel layer to separate the powder and liquid layers formulated and layered such that there is minimal or no penetration of the gel and/or liquid formulations into the powder layer.

FIG. 8A shows an exemplary open container. FIG. 8B shows a film that may be used as a top to seal the open container and form a pouch.

DETAILED DESCRIPTION OF THE INVENTION

Figure 1A:
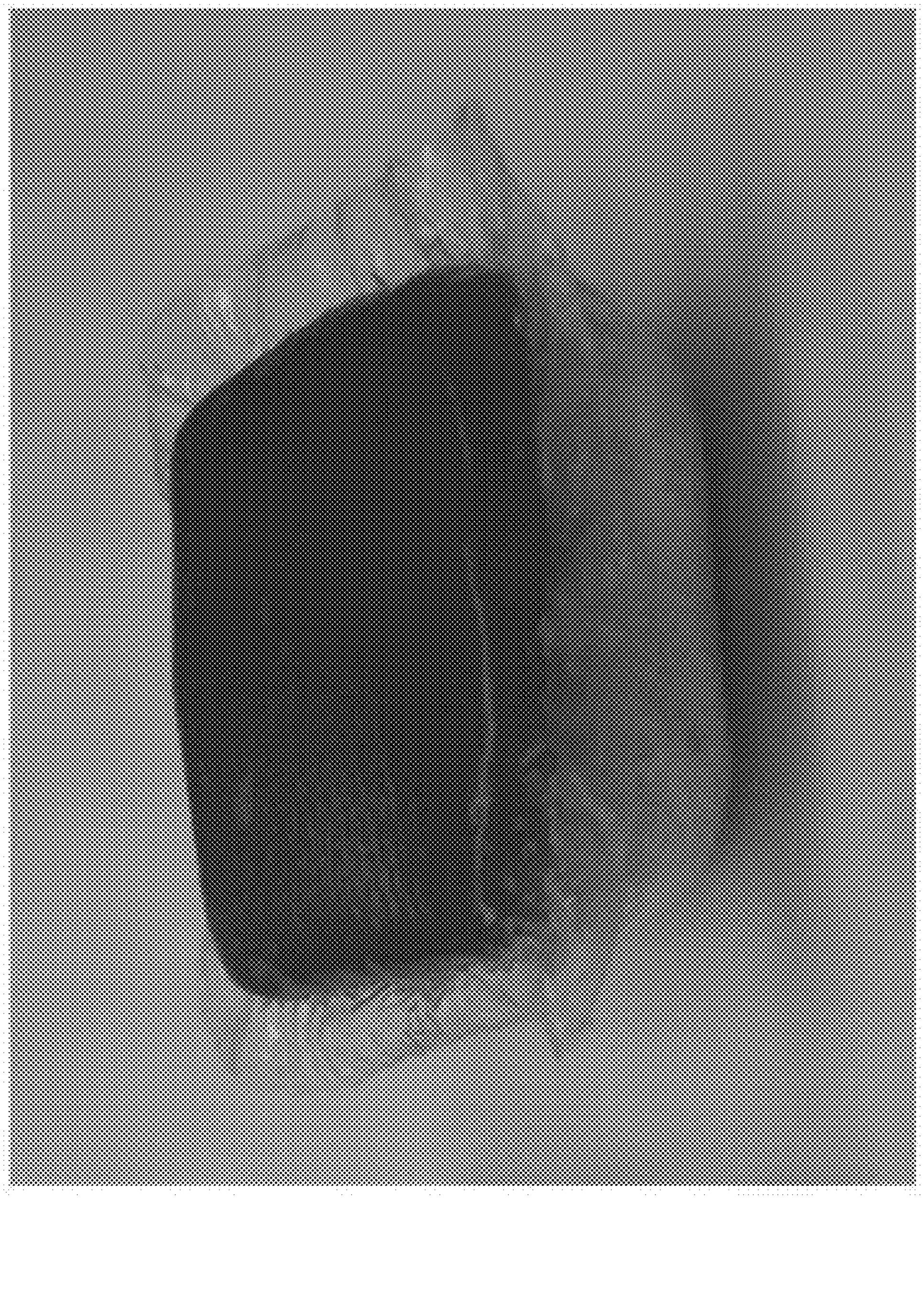
FIGS. 1A, 2A, 2B, 3A, 4A, 4B, and 5A are photographs illustrating exemplary unit-dose detergent compositions.
Figure 1B:
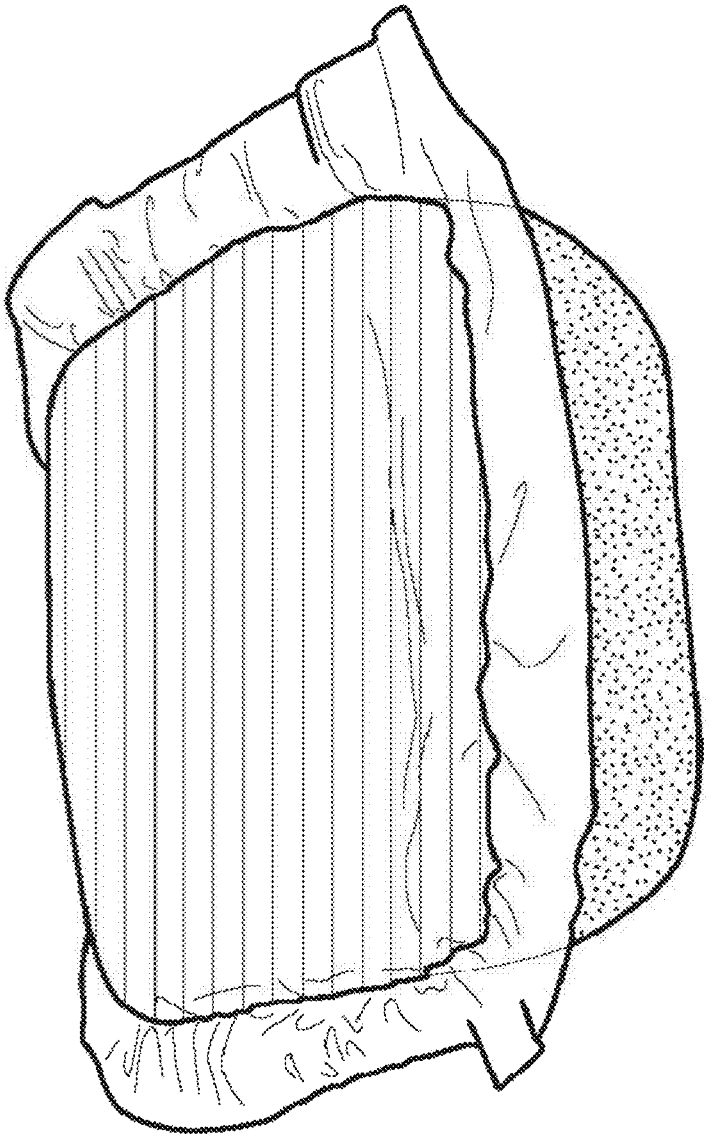
FIGS. 1B, 2C, 2D, 3B, 4C, 4D, and 5B are drawings providing black and white line renderings of these photographs, respectively.
Figure 2B:
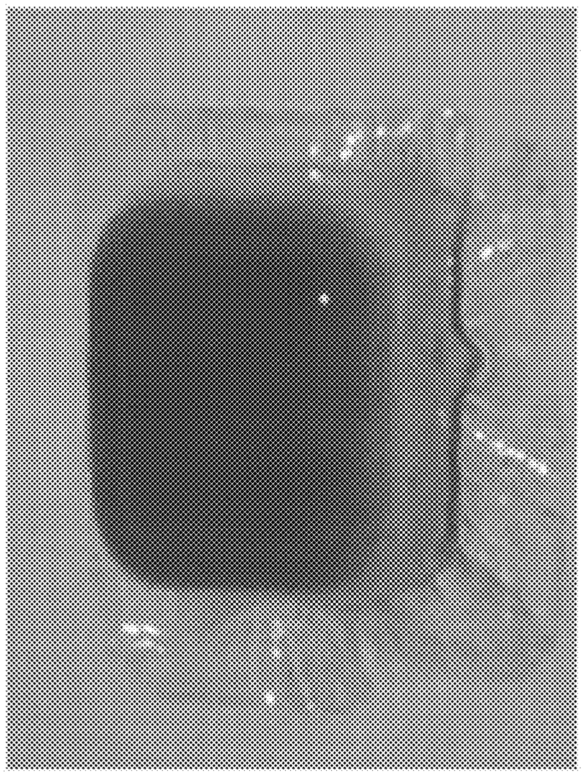
Figure 2A:
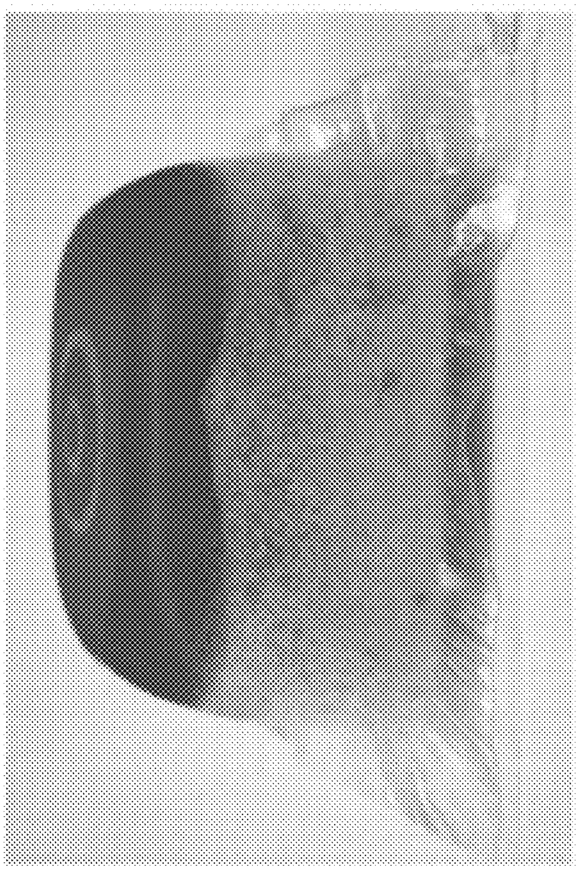
Figure 2D:
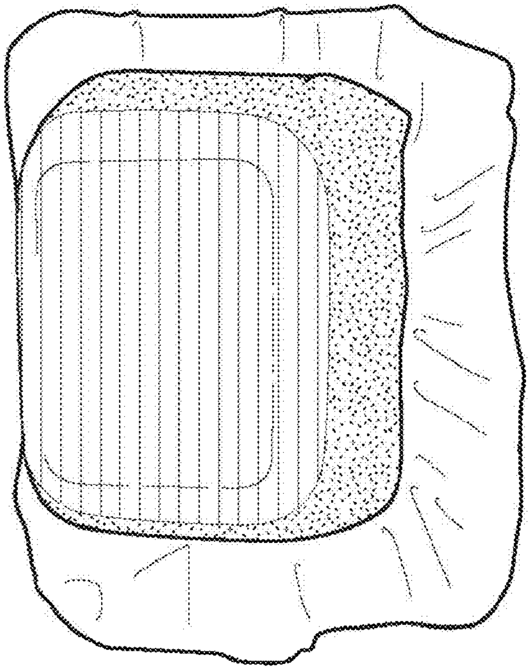
Figure 2C:
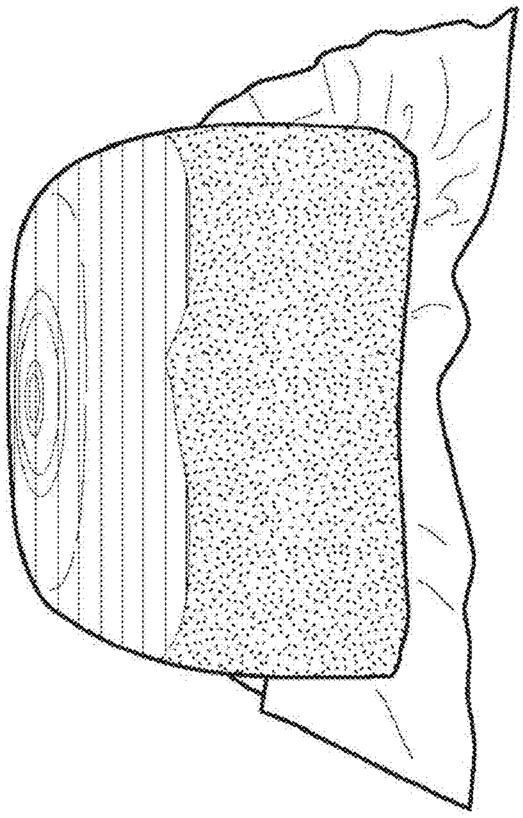
Figure 3A:
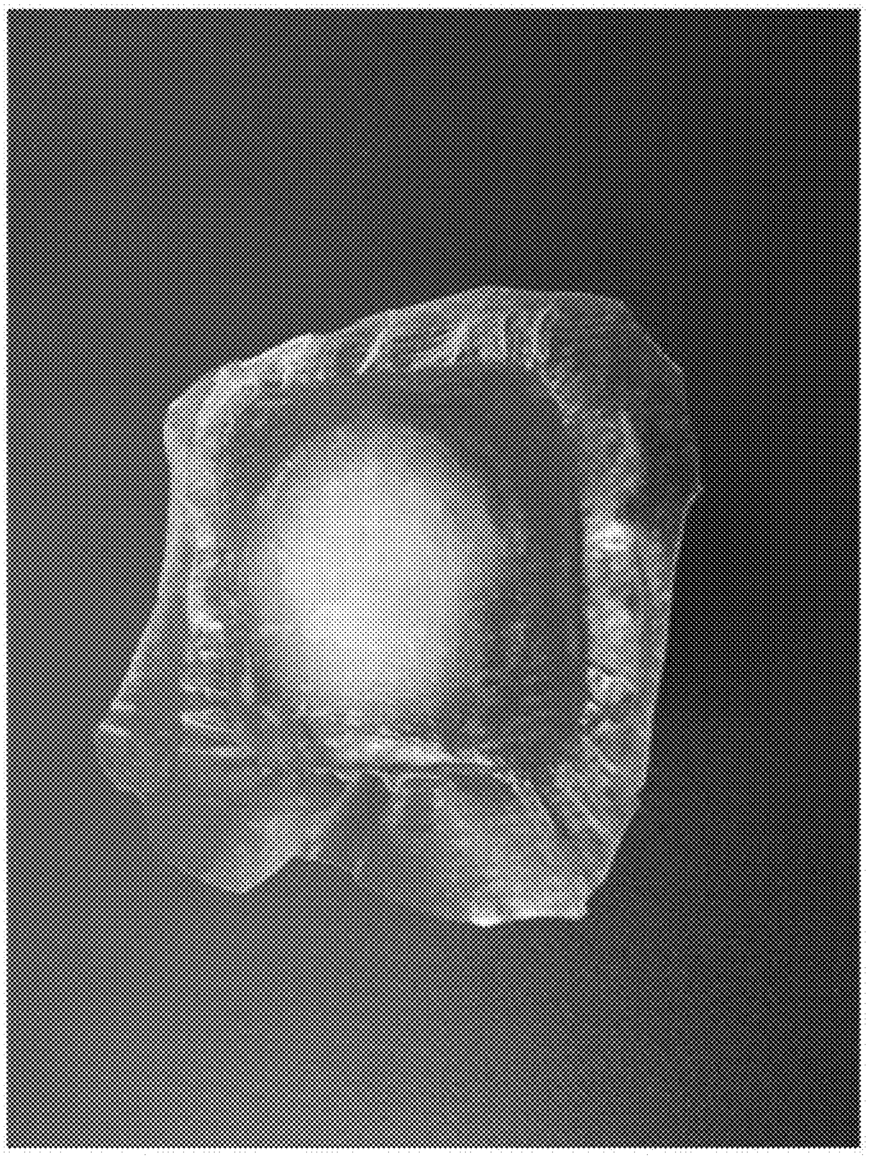
Figure 3B:
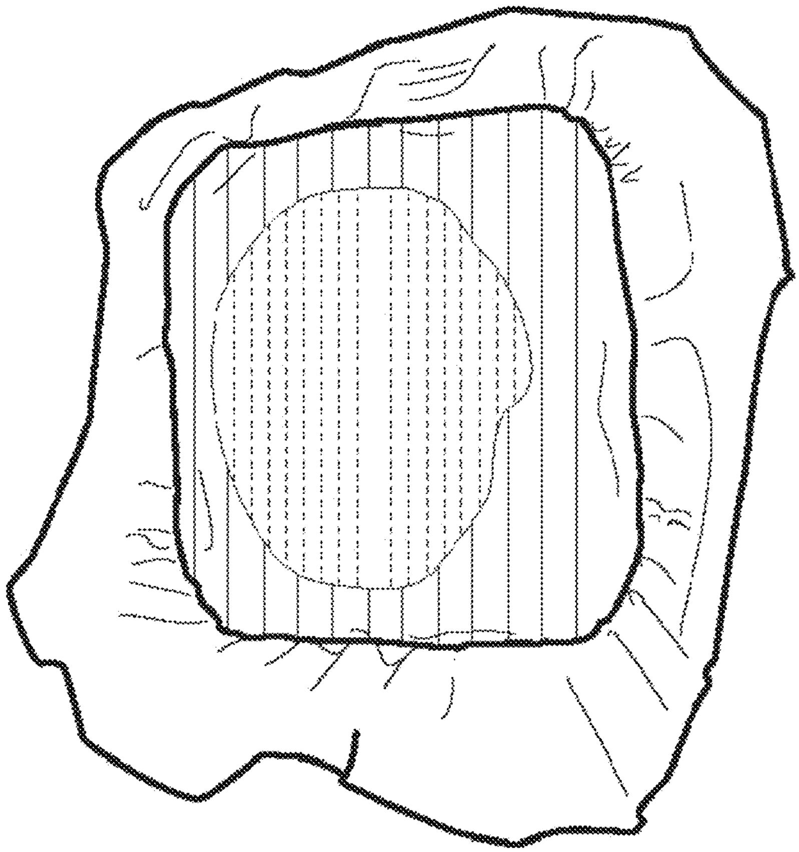
Figure 4B:
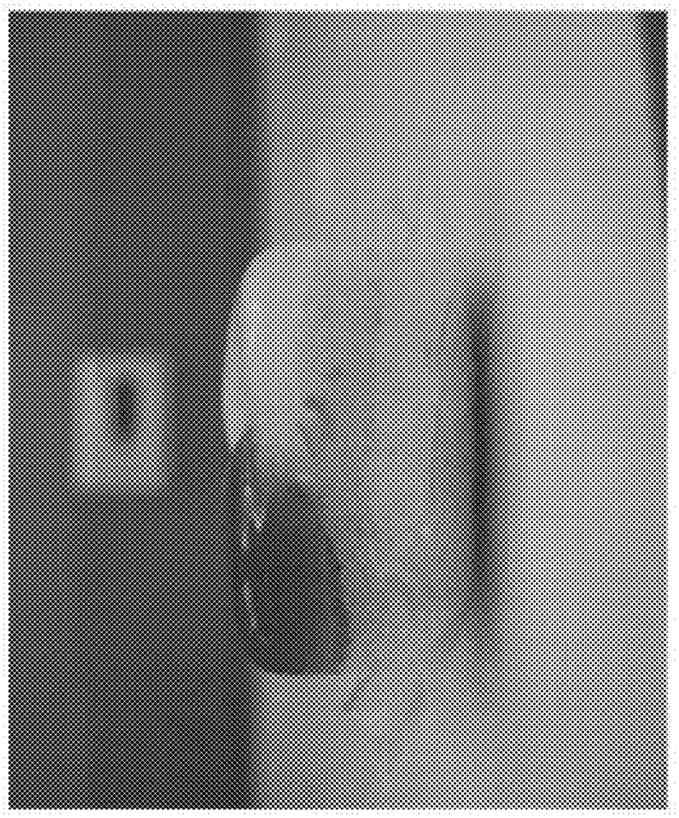
Figure 4A:
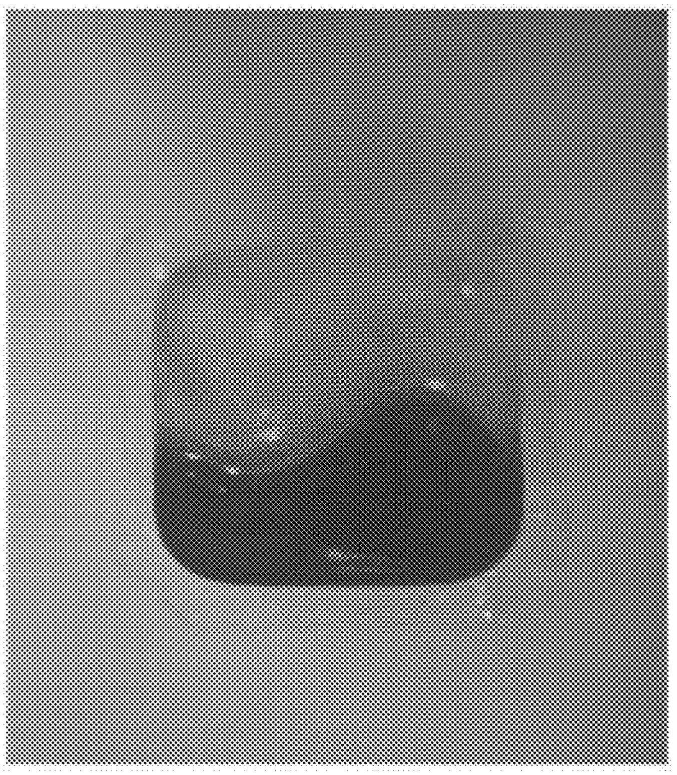
Figure 4D:
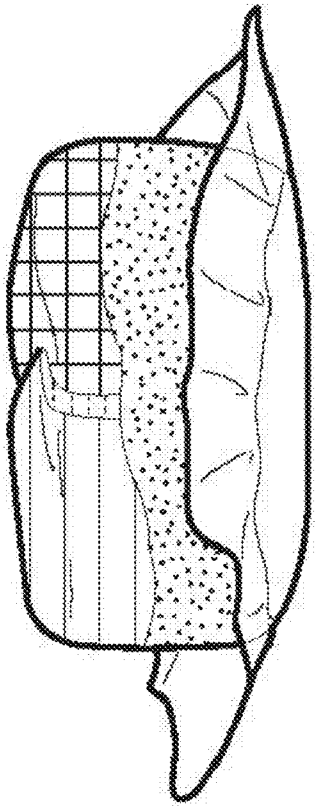
Figure 4C:
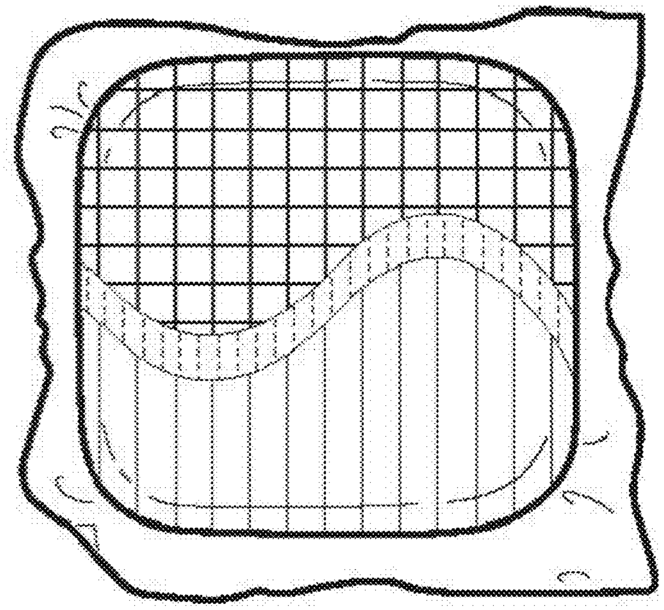
Figure 5A:
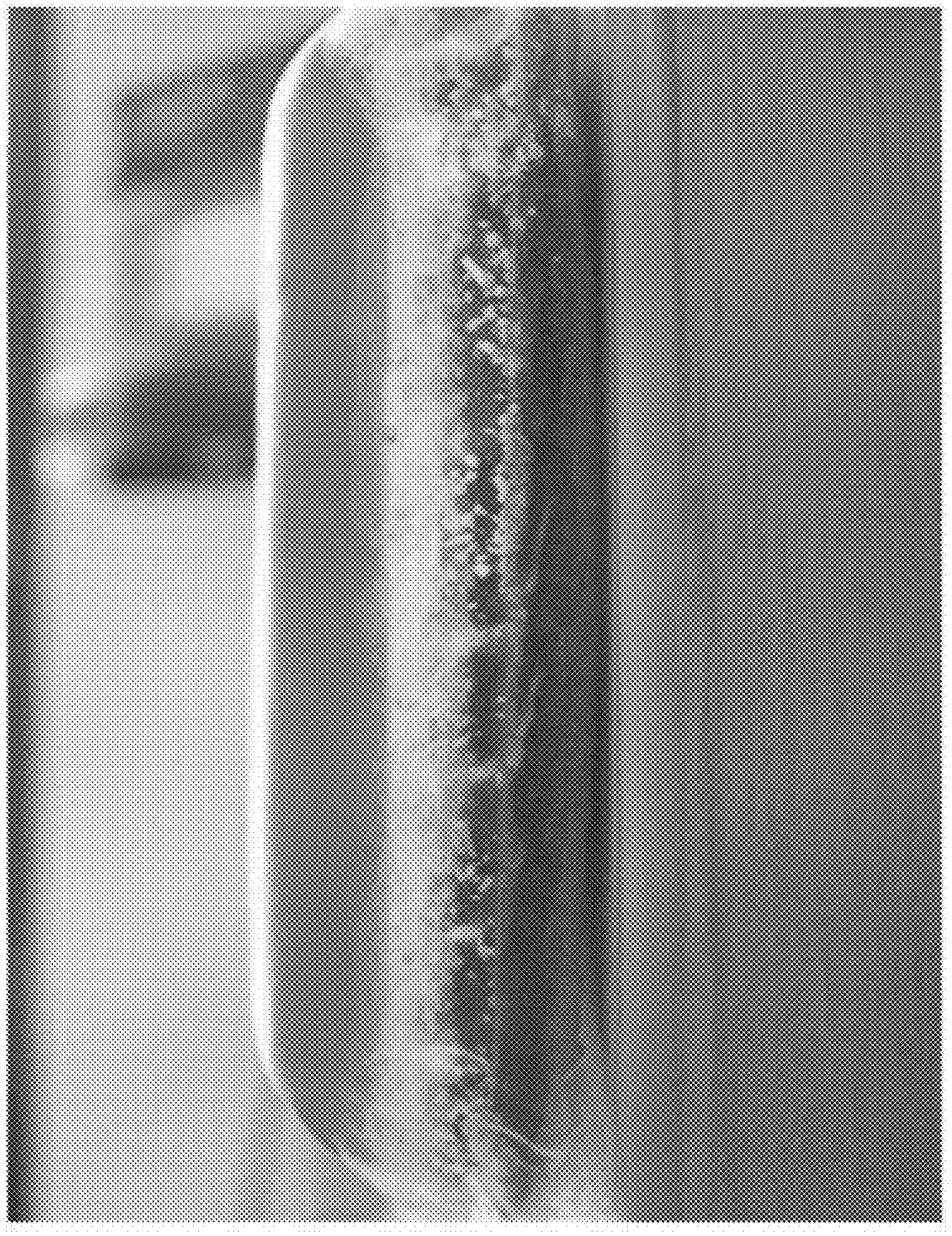
Figure 5B:
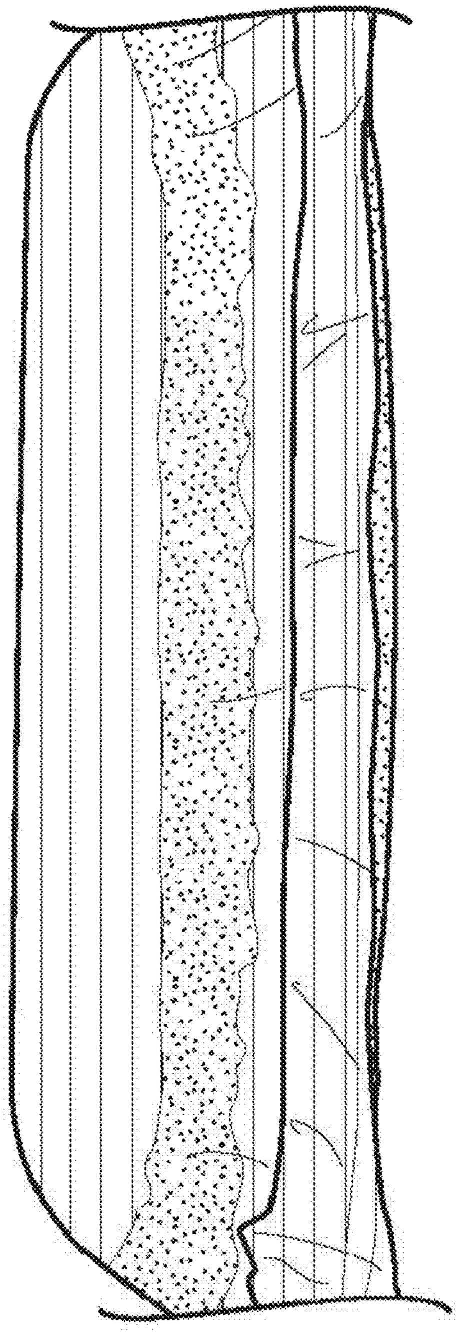
Figure 6B:
FIGS. 6A and 6B are photographs of exemplary unit-dose detergent compositions in single-compartment PVOH pouches, showing a variety of color and shape combinations suitably used with the present compositions.
Figure 6A:
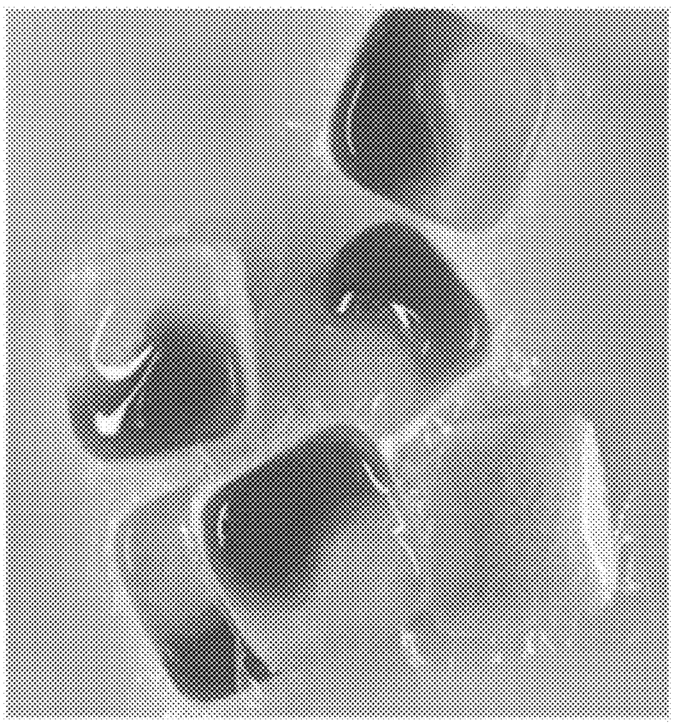
Figure 6D:
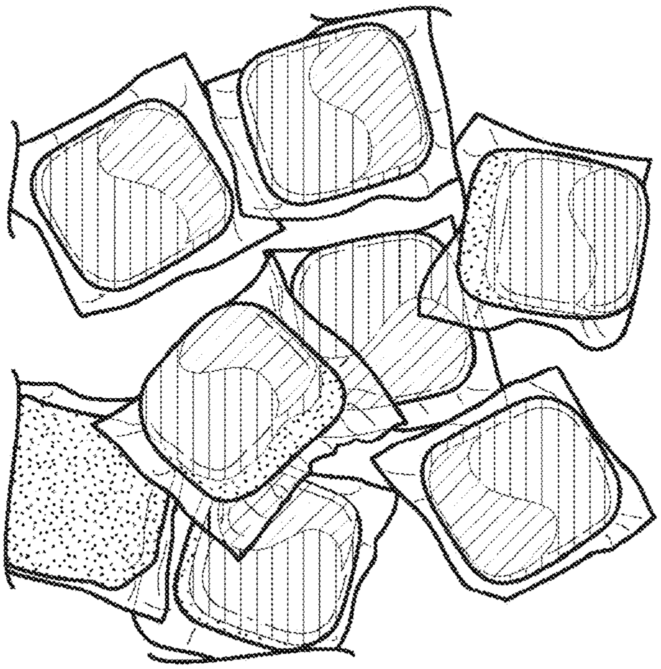
FIGS. 6C and 6D are black and white line renderings of FIGS. 6A and 6B, respectively.
Figure 6C:
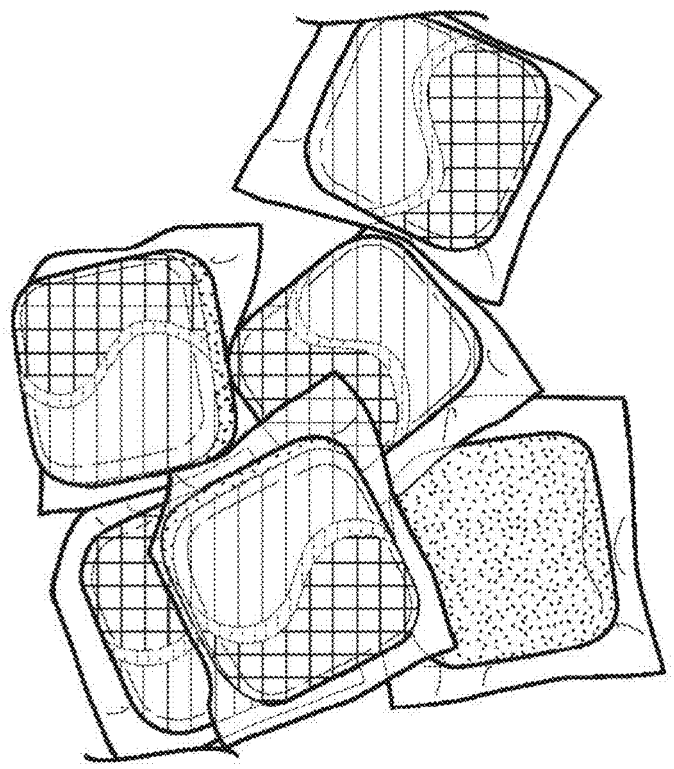

Many household and industrial cleaners include more than one cleaning component or element. For convenience, many of these cleaners are packaged in single-unit packages as unit-dose detergent products. To improve effectiveness of the unit-dose detergents, it may be necessary to keep the multiple components separate until the unit-dose package is used for cleaning. Other advantages of unit-dose detergent products include convenience of use and dispensing, lower cost per use, and avoiding or minimizing direct skin with contact the detergent itself.

In some unit-dose detergent products, a gel is used as a cleaning component. However, using a gel can create difficulties related to quickly spreading the gel to all cavities of the unit-dose detergent product while also maintaining a continuous process. Further, there are challenges related to maintaining complete separation of multiple components of the unit-dose detergent product without physical barriers.

Further, in many systems for producing a unit-dose detergent product, the dosing process, which involves adding various components such as liquids, powders, or gels to the unit-dose detergent product, is the rate limiting step. Several failure modes, such as splashing, sloshing, foaming, stringing, and mounding, tend to limit rate. Many of these failure modes can be mitigated by adjusting the viscosity of the fill or thickening the product to prevent the product from sliding out of the cavity upon filling.

Individually, there are many ingredients that could improve the performance of a unit-dose detergent product. But, many of these ingredients cannot always be simply added to the existing formula because of physical or chemical incompatibility. Physical barriers are often used to successfully separate incompatible ingredients. However, physical barriers are complex and expensive because of the added barrier layer.

An alternative to physical barriers is to add structurants, such as a gelling agent (e.g. a gel-forming stearate, Pluronic, or any other component that may function as a gelling agent), to the unit-dose detergent product. Structurants slow the degradation processes so that the end product is stable relative to the expected shelf life. However, structure development rates can be very slow relative to film forming rates. This can reduce efficiency of a continuous process and lead to large and expensive delays due to the required residence time.

It has been found that a supercooled gel effectively spreads throughout a pouch, while also gelling rapidly, as desired during manufacturing. The supercooling may be done as part of a continuous process. Placing some components in a gel provides complete separation between the gel components and other components of the unit-dose detergent product without requiring a physical barrier between the various components.

A purely supercooled liquid has a viscosity that is similar to the melt. Partial nucleation can have a large effect on the rheological properties of the slurry. Particle-particle interactions may become significant at 5% solids formation. In other systems, such as dilute phase pneumatic conveying, also show that particle-particle interactions become significant at 2.5% solids formation. Supercooling systems enable the generation of a small fraction of nucleates, giving a secondary benefit to control the viscosity at the filler and mitigate some of the failure modes.

The use of structurants and supercooling solves both problems by providing a liquid that can be molded into an aesthetically appealing shape yet rapidly form structure, which reduces equipment sizes and manufacturing costs.

Unit-Dose Detergent Compositions

In some embodiments, a unit-dose detergent product comprises a water-soluble compartment container defining at least one compartment and at least one cleaning composition. In some embodiments, the water-soluble compartment container is in the shape of a pouch. The cleaning composition may be a solid powder, a liquid, or a gel.

In some embodiments, the water-soluble compartment container contains both a gel and one or more other components, with no intermixing occurring at the interface between the solid gel composition and the other components. FIGS. 1A-6D show various exemplary unit-dose detergent products. FIGS. 7A-7D illustrate that multiple components can be placed in the same compartment with no intermixing between the components.

Figure 8B:
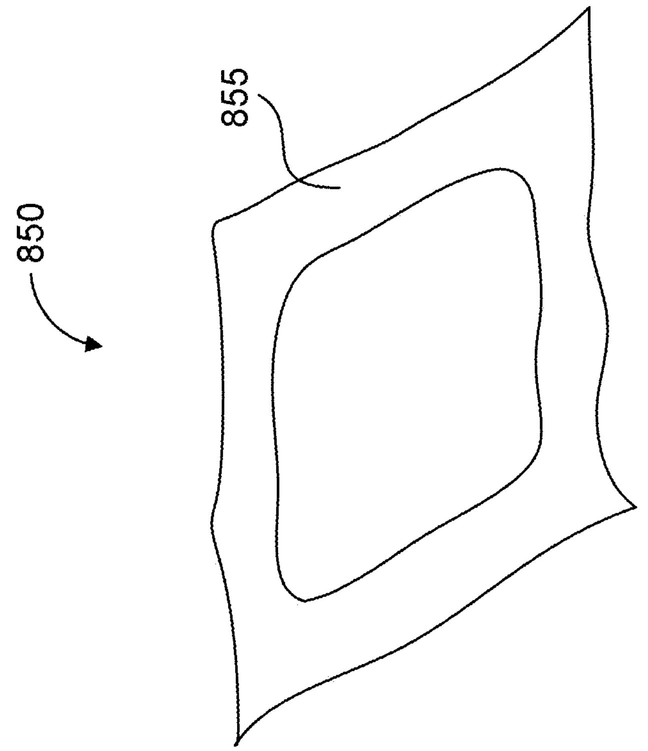
FIGS. 8A and 8B show exemplary components of a pouch.
Figure 8A:
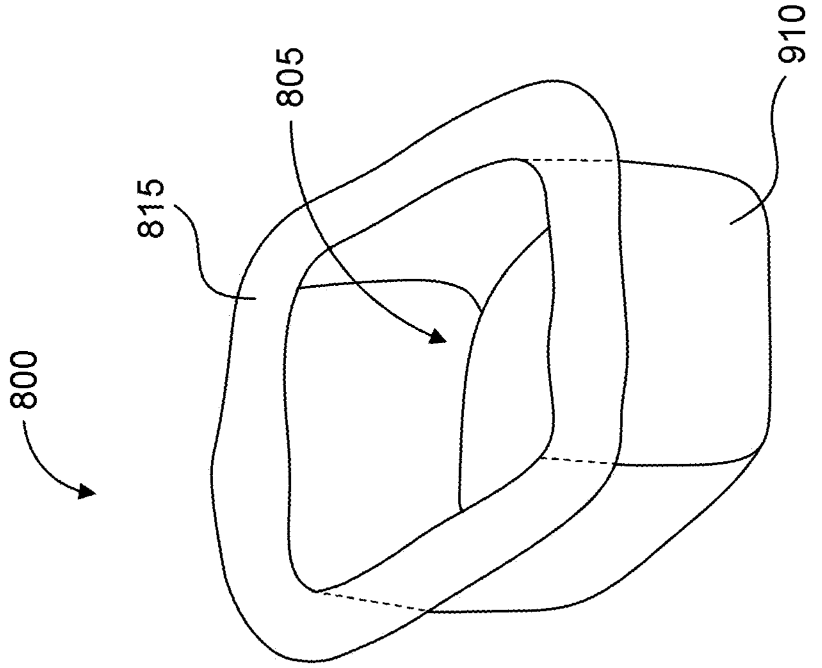

In some embodiments, as shown in FIGS. 8A and 8B, the unit-dose detergent product comprises a water-soluble open container made of film 800 and film 850. In some embodiments, film 800 is shaped into cavity 805. Cavity 805 may comprise sidewalls 810 and lip 815. Film 850 may comprise lip 855. In some embodiments, one or more detergent components are dosed in cavity 805. In some embodiments, two cavities as shown in FIG. 8A are sealed to each other to form a pouch. In some embodiments, film 800 and film 850 are sealed to each other to form a pouch.

The unit-dose detergent product includes a water-soluble cavity. The water soluble cavity may include one or more compartments. The water-soluble cavity may be made from a water-soluble material which dissolves, ruptures, disperses, or disintegrates upon contact with water, releasing the composition contained therein. The water soluble cavity may be formed from a water soluble polymer. Non-limiting examples of suitable water soluble polymers include polyvinyl alcohol, cellulose ethers, polyethylene oxide, starch, polyvinylpyrrolidone, polyacrylamide, polyacrylonitrile, polyvinyl methyl ether-maleic anhydride, polymaleic anhydride, styrene maleic anhydride, hydroxyethylcellulose, methylcellulose, polyethylene glycols, carboxymethylcellulose, polyacrylic acid salts, alginates, acrylamide copolymers, guar gum, casein, ethylene-maleic anhydride resins, polyethyleneimine, ethyl hydroxyethylcellulose, ethyl methylcellulose, hydroxyethyl methylcellulose, and mixtures thereof.

In some embodiments, the water-soluble single-compartment cavity is made from a lower molecular weight water-soluble polyvinyl alcohol (PVOH) film-forming resin.

In some embodiments, the water-soluble cavity may further contain a cross-linking agent, e.g., a cross-linking agent selected from the group consisting of formaldehyde, polyesters, epoxides, isocyanates, vinyl esters, urethanes, polyimides, acrylics with hydroxyl, carboxylic, isocyanate or activated ester groups, bis(methacryloxypropyl)tetramethylsiloxane, n-diazopyruvates, phenylboronic acids, cis-platin, divinylbenzene, polyamides, dialdehydes, triallyl cyanurates, N-(2-ethanesulfonylethyl)pyridinium halides, tetraalkyltitanates, titanates, borates, zireonates, and mixtures thereof. In some embodiments, the cross-linking agent is boric acid or sodium borate.

In some embodiments, the water-soluble cavity can have a protective layer between the film polymer and the composition contained therein. In some embodiments, the protective layer may comprise polytetrafluoroethylene (PTFE).

The water soluble single-compartment cavity may be in any suitable or desirable form, for example, in the form of a pouch. In some embodiments, the water soluble cavity has a single compartment. In some embodiments, the water soluble cavity has more than one compartment. In some embodiments, each compartment has only one component. In some embodiments, each compartment has more than one component, and at least one of the components is a gel.

Solid Gel Properties and Supercooling

In some embodiments, the unit-dose detergent pouch comprises a solid gel composition. Maintaining stability of the gel is one important component to maintaining a continuous process. However, traditional cooling methods do not provide fast cooling while also enabling the liquid to spread to all cavities of the pouch before forming a gel. Supercooling the liquid before applying it to the pouch ensures that the gel spreads to all cavities of the pouch and allows for fast cooling.

In some embodiments, the gel is a stearate gel that is capable of being supercooled. One exemplary gel formulation comprises a non-ionic surfactant in an amount from about 2.5 wt % to 50 wt %, a polar organic solvent in an amount up to about 70 wt %, water, and a water soluble structuring agent in an amount from 0.5 wt % to about 15 wt % or a water soluble co-structuring agent in an amount from 0.5 wt % to about 65 wt %, or a combination thereof.

Figure 9:
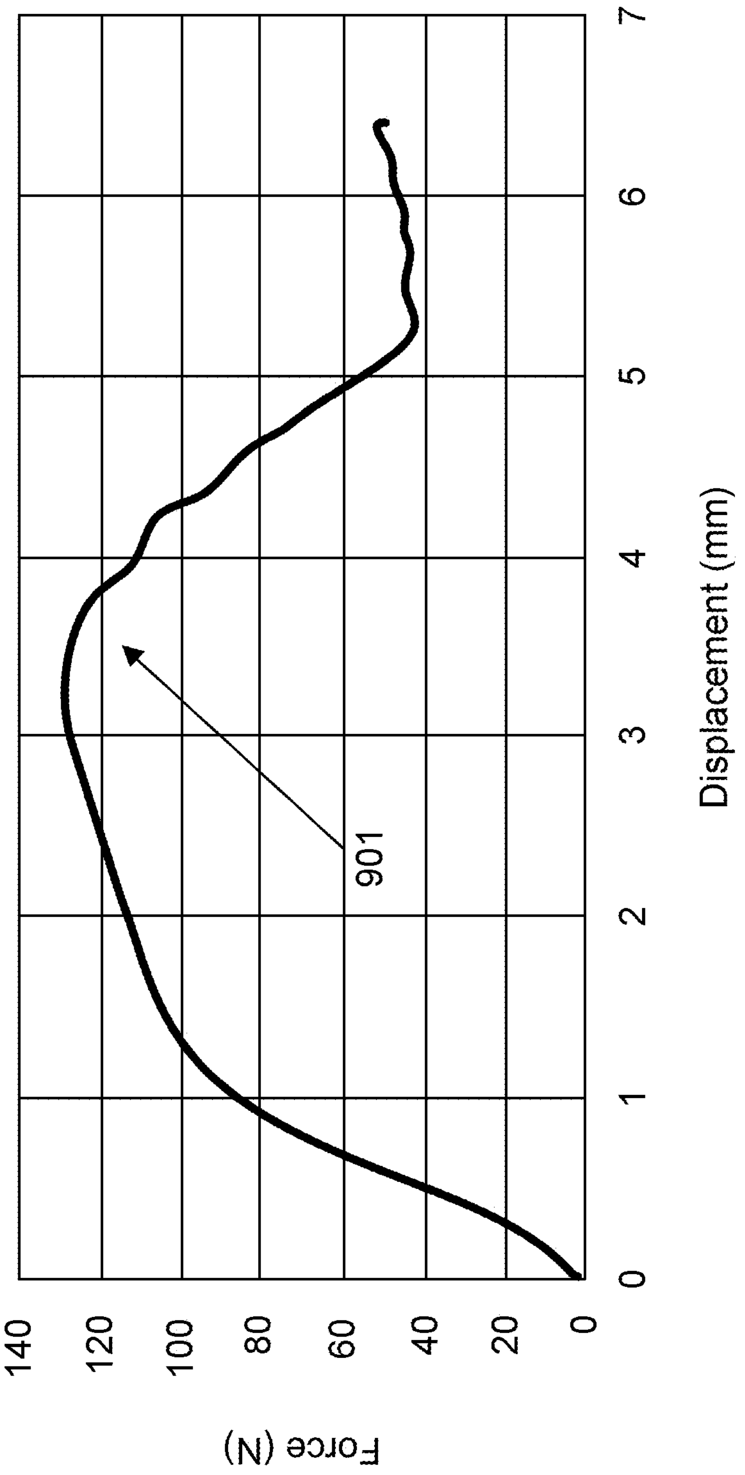
FIG. 9 is a graph obtained from gel hardness measurement an exemplary solid gel using a force analyzer.

In some embodiments, the non-ionic surfactant is Plurafac® SLF-180, the polar organic solvent is dipropylene glycol (DPG), and the structuring agent is sodium stearate. In some embodiments, the gel comprises 25% Plurafac® SLF-180, 5% sodium stearate, 19% water, and 51% DPG. FIG. 9 shows gel hardness measurements for a gel having this composition. Other examples may be found in U.S. Provisional Application 62/419,708, which is incorporated by reference in its entirety. Any suitable gel composition may be used.

In some embodiments, the solid gel of the present disclosure has a hardness of 10 N, 20 N, 30 N, 40 N, 50 N, 60 N, 70 N, 300 N, 400 N, or 500 N, or any range defined by any two of those endpoints. In some embodiments, the hardness was measured on a circular solid gel sample with dimensions of 1 inch diameter×0.5 inch thickness, or 1 inch diameter×0.15 inch thickness, using a force analyzer. Molten gel composition was cast into a circular mold (1 inch diameter×0.5 inch in thickness), opened at both ends and placed on a metal sheet. After cooling and being solidified, excess solid gel was scraped to provide a flat surface. The solid gel was then placed into a bag and placed between the two plates. The instrument moves downward 1 inch/min until the sample was displaced by 0.25 inches. Force (in Newton, N) at the yield point indicated by arrow 901 was recorded as a function of displacement distance. A gel that can withstand a higher force is a stronger gel. Gel hardness may be measured using a force analyzer. The yield strength is recorded as the highest force before the gel structure breaks, indicated by a decrease in the force. Preferably, gel hardness is controlled because it impacts adhesion to the film. Additionally, if gel segments are loose in the capsule, they tend to submarine into the powder. It is noticed that when the gel segments are in contact with or adhere to a flattened powder dose, the incident of gel shifting failure is reduced. Thus, in some embodiments, proper cavity design and filling process are utilized to obtain a flatten powder segment, wherein the flatten powder segment is in contact with or attached to gel segments.

FIG. 9 is a graph showing gel hardness as a function of displacement for an exemplary stearate gel.

The solid gel may be prepared by solidification from a supercooled liquid. In some embodiments, one of the components is a gel at room temperature. In some embodiments, one of the components is a gel at temperatures above room temperature, for example, 150° F. or higher. That component may be heated to above its melting point to form a liquid. The liquid may then be supercooled. The component may be applied to the film as a liquid and cooled to form a gel at room temperature.

Generally, higher rates of cooling lead to greater degrees of supercooling. Differential Scanning calorimetry (DSC) is a useful technique to determine the potential amount of supercooling possible and characterize the gel under controlled laboratory conditions. DSC is an instrumental method to quantify the heat flow into or out of a sample when it is subjected to a controlled rate of external heating or cooling. Typically with DSC, a small sample is placed in a pan and is subjected to either heating or cooling temperature ramp and the heat flow is measured.

Figure 10:
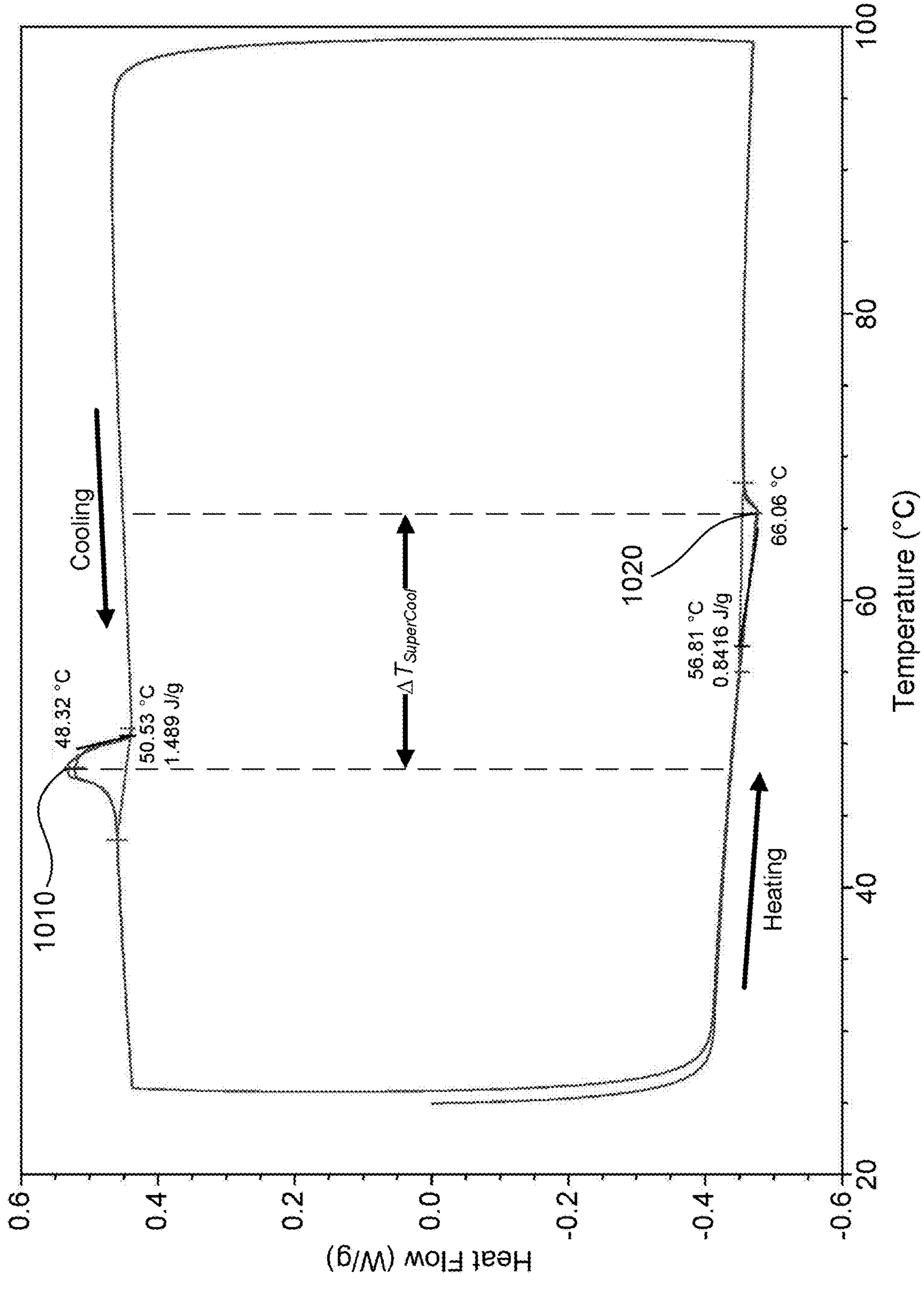
FIG. 10 shows a chart of heat flow versus temperature (° C.) for a process that heats a gel to above its melt temperature to form a liquid, then supercools the liquid.

FIG. 10 shows DSC data for an exemplary gel formulation. To determine the DSC data shown in FIG. 10, the gel was placed into a sample pan at room temperature and subjected to a heat-cool cycle to erase thermal history (data for the heat-cool cycle is not shown). The sample was then heated at a controlled rate of 10° C./min. The sample showed an endothermic transition at 66.05° C. (local minima 1020), which represents the melting point of the sample. The heating continued to 100° C. The sample was then cooled at a rate of 10° C./min. The sample showed an exothermic transition starting at 50.53° C. and peaking at 48.32° C. (local maxima 1010), which represents crystallization. The difference in the peak heat flow between heating and cooling cycles, and the peak-to-peak difference between the heating and cooling cycle is the degrees of supercooling, $\Delta T_{supercool}$. A difference in temperature between a sample's melt temperature and crystallization temperature indicates that the sample is capable of being supercooling. Changes in heating and cooling rates may affect the supercooling process. Faster cooling rates lead to greater degrees of $\Delta T_{supercool}$. For example, increasing the cooling rate from 2° C./min to 20° C./min may provide an additional 10° C. of supercooling.

In some embodiments, $\Delta T_{supercool}$ is 5° F., 10° F., 15° F., 20° F., 25° F., 30° F., 35° F., 40° F., 45° F., 50° F., or any range defined by any two of those endpoints. In some embodiments, $\Delta T_{supercool}$ is in the range of 20° F. to 30° F.

Before the first cavity and second cavity have been dosed with one or more components, the films that form the cavities may be wetted. Wetting the film may improve the adhesion of the gel to the film. Further, wetting the films improve the seal between the first film and the second film. However, too much wetting may reduce the ability of the gel to adhere to the film or reduce the strength of the seal between the two films to form. Further, because the film is water soluble, too much water may cause the film to dissolve. In some embodiments, a wetting device is used to continuously apply water to the film as it passes the wetting device. In some embodiments, the wetting is controlled by adjusting the speed of the wetting device. It has been noticed that sealing temperature affects on adherence of the films. As the temperature increases, the adherence is negatively impacted.

In some embodiments, after the film wetting, one or more components are dosed in the open cavity. In other embodiments, one or more components (e.g., powder components) are dosed in the open cavity before the file wetting. In some embodiments, the first component is a supercooled liquid that gels after contacting the film. In some embodiments, the open cavity is dosed with the first component at a temperature of 125° F., 130° F., 135° F., 140° F., 145° F., 150° F., 155° F., 160° F., 165° F., 170° F., 175° F., 180° F., 185° F., 190° F., 195° F., or 200° F., or any range defined by any two of those endpoints. In some embodiments, the first component is dosed at a temperature in the range of 140° F. to 160° F.

After wetting and dosing, the two different films that have been wetted may be sealed together to form a pouch containing the one or more components, including at least one gel. Preferably, the pouch is stored in an environment with at 23° C. (73° F.) with a relative humidity (RH) of 38%.

After the cavity has been dosed with the supercooled liquid to form a liquid and sealed to form the pouch, some gas may be left inside the pouch. If gas is left in the pouch, gel segments may fall into the other components present in the pouch. For example, if the supercooled liquid is added to the pouch to form the gel and a solid powder is added to the pouch and the pouch is sealed, the gel may fall into the solid powder.

Sometimes, gas may form inside the pouch after it is sealed. This gas may cause the gel to detach from the pouch and mix with other components in the pouch. In order to avoid this mixing of the gel with the other components, the film that forms the pouch may be perforated to allow gas to escape. While it is not necessary, vacuum may be applied to assist with gas escape. Proximity of the perforations to the gel may assist with releasing the gas and preventing gel from falling into the other components. However, if the perforations contact the gel, gel may undesirably ooze out of the pouch. So, in some embodiments, the distance between at least one perforation and the gel is in the range of 0.004 inches, 0.01 inches, 0.015 inches, 0.02 inches, 0.025 inches, 0.3 inches, 0.04 inches, 0.05 inches, 0.06 inches, 0.07 inches, 0.08 inches, or any range defined by any two of those endpoints. In some embodiments, the distance between all perforations and the gel is in the range of 0.004 inches, 0.01 inches, 0.015 inches, 0.02 inches, 0.025 inches, 0.3 inches, 0.04 inches, 0.05 inches, 0.06 inches, 0.07 inches, 0.08 inches, or any range defined by any two of those endpoints. In some embodiments, the distance between all perforations and the gel is in the range of 0.05 inches and 0.07 inches.

In some embodiments, the perforation is performed immediately after the pouch is sealed. In some embodiments, the perforation starts within 700 ms to 900 ms after the pouch is sealed. In some embodiments, the perforation process starts 800 ms after the pouch is sealed. In some embodiments, a single perforation is made every 10 ms to 20 ms. In some embodiments, a single perforation is made every 15 ms. In some embodiments, the pouch has 6 perforation holes. In some embodiments, each perforation hole has a diameter of 0.002 inches to 0.008 inches. In some embodiments, each perforation hole has a diameter of 0.005 inches.

The perforation step may be performed using a laser perforation method, a mechanical perforation method, or a water misting method. In some embodiments, the laser perforation method includes perforating the film with a laser having a power of 30 watt and a wavelength of 10.6 μm (micron). In some embodiments, the mechanical perforation uses a pin to perforate the film. In some embodiments, the water misting method uses a solution that contacts the film through a mist, a stream, or a spray.

Figure 11:
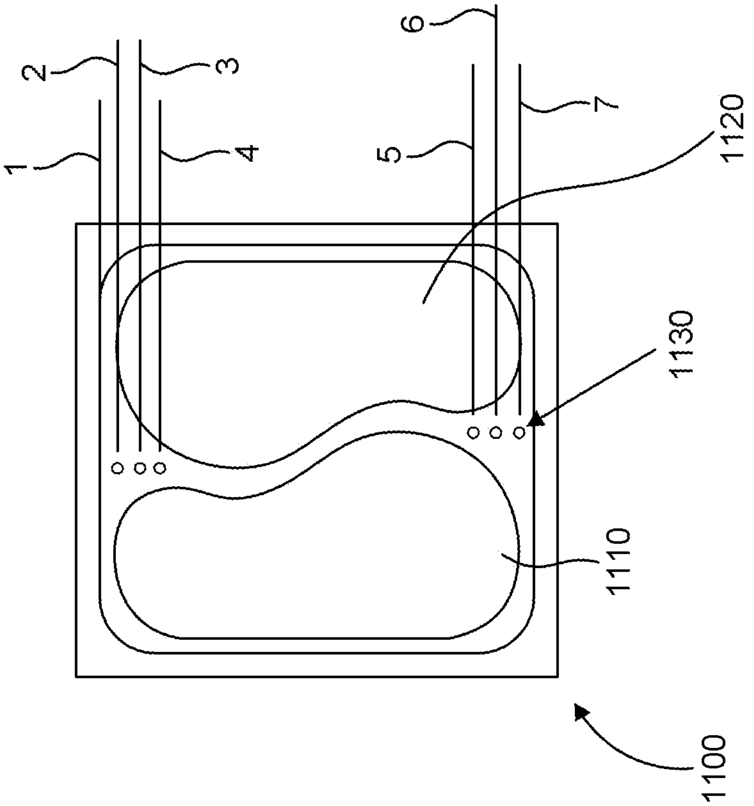
FIG. 11 shows an exemplary unit-dose detergent product with film perforations.

As shown in FIG. 11, pouch 1100 may comprise first component 1110, second component 1120, and perforations 1130. In some embodiments, the perforations are spaced between 0.04 inches to 0.08 inches apart. Lines 1, 2, 3, 4, 5, 6, and 7 each correspond to a perforation on pouch 1100. As shown in FIG. 11, the spacing between line 1 and lines 2, 3, 4, 5, 6, and 7 is 0.06 inches, 0.14 inches, 0.21 inches, 1.29 inches, 1.36 inches, and 1.44 inches, respectively.

Configurations of the Unit-Dose Detergent Product

The unit-dose detergent products may have various configurations. The pouch may contain multiple layers of gel, liquid, or solid powder. As shown in FIGS. 2A-2D, the pouch may contain two layers, with little or no intermixing between the layers. In some embodiments, one layer is a gel, and one layer is either a solid powder or a liquid. In some embodiments, both layers are a gel. FIGS. 3A-4D show examples of pouches with more than one gel.

Figure 7B:
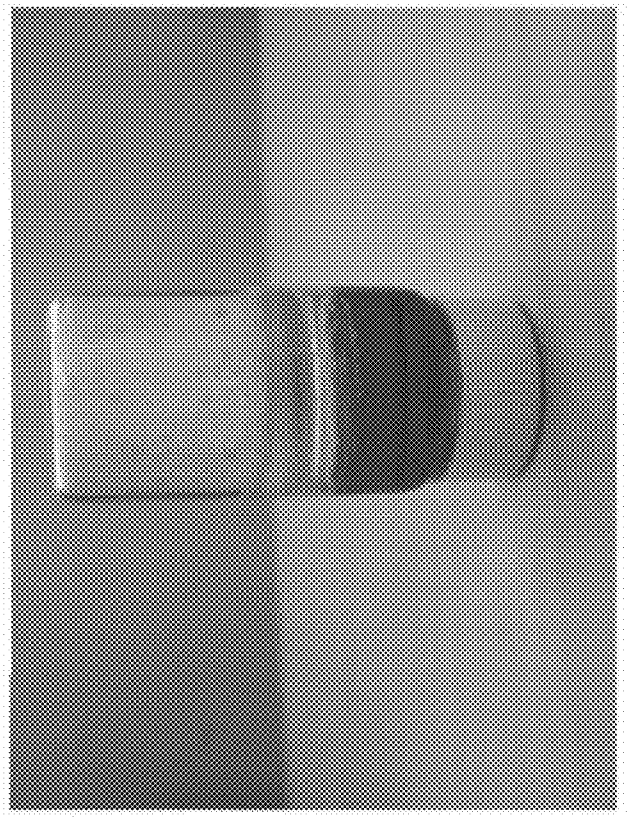
FIGS. 7A and 7B are each a photograph of a sealed glass container
Figure 7A:
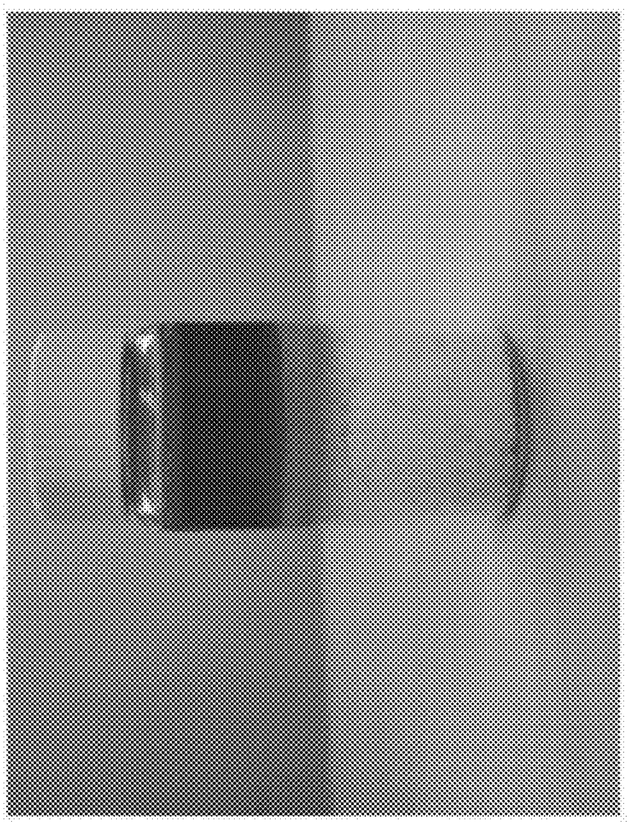
Figure 7D:
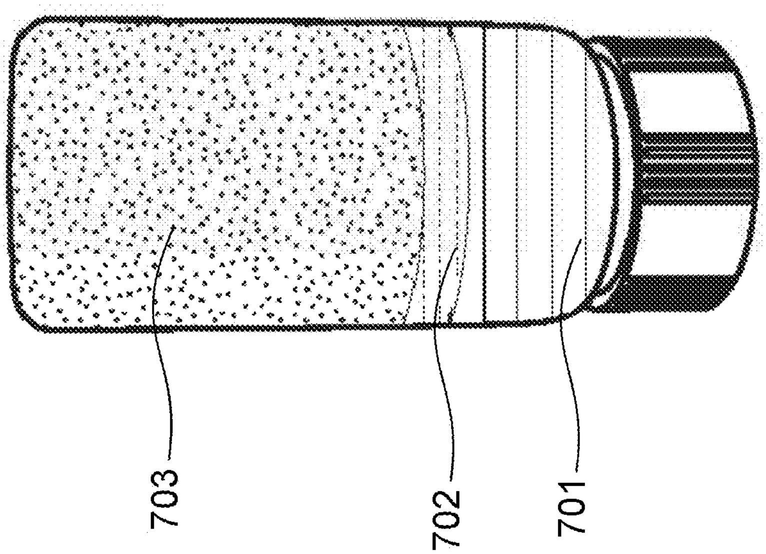
FIGS. 7C and 7D are black and white line renderings of the photographs of FIGS. 7A and 7B, respectively.
Figure 7C:
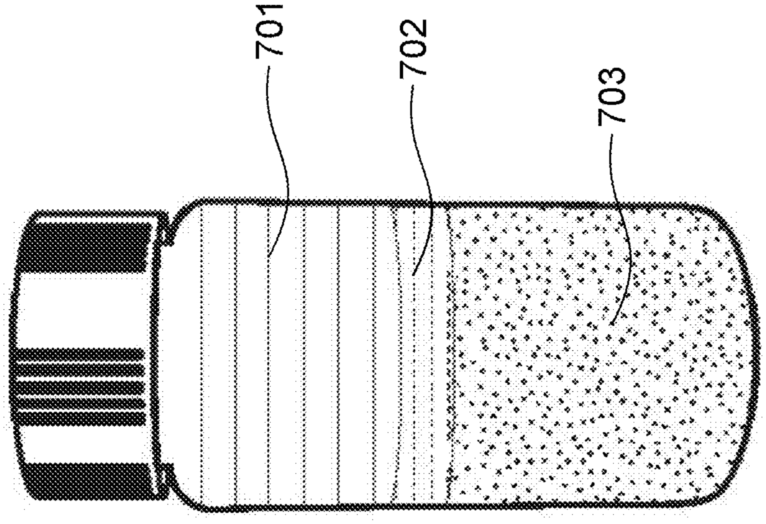

As shown in FIGS. 7A-7D, one or more liquid phases can be introduced or layered into the compositions of the present invention. In some embodiments, at least one layer of a gel composition is used as a barrier between powder and liquid. For example, as shown in FIGS. 7C and 7D, gel layer 702 serves as a barrier between layer 701 and layer 703.

Figure 12B:
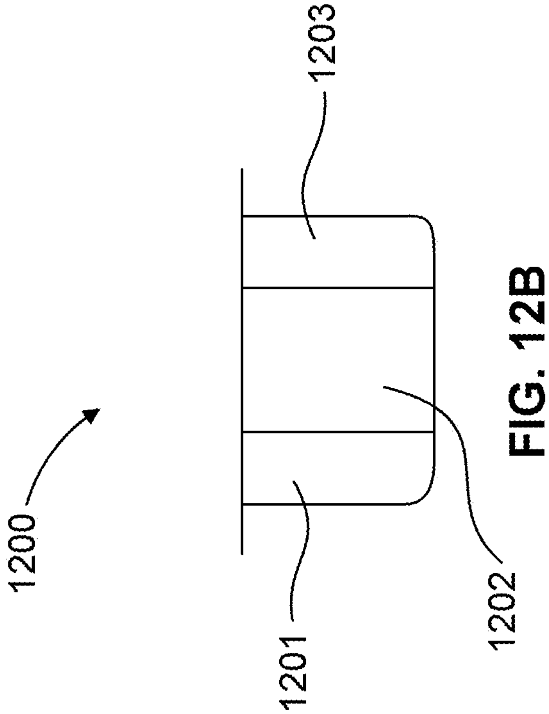
FIGS. 12A-12D show exemplary configurations of a unit-dose detergent product.
Figure 12D:
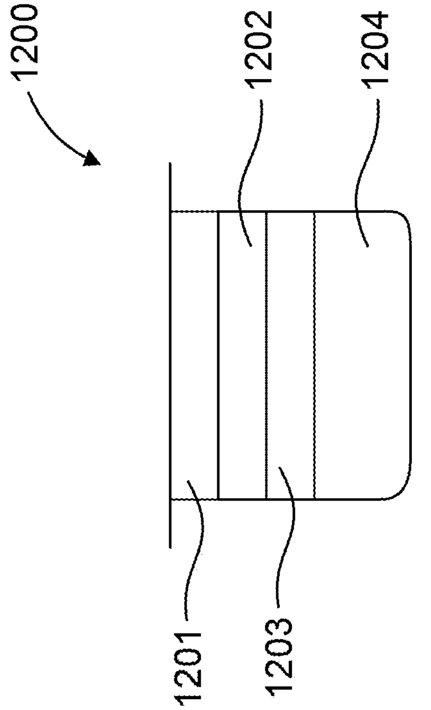
Figure 12A:
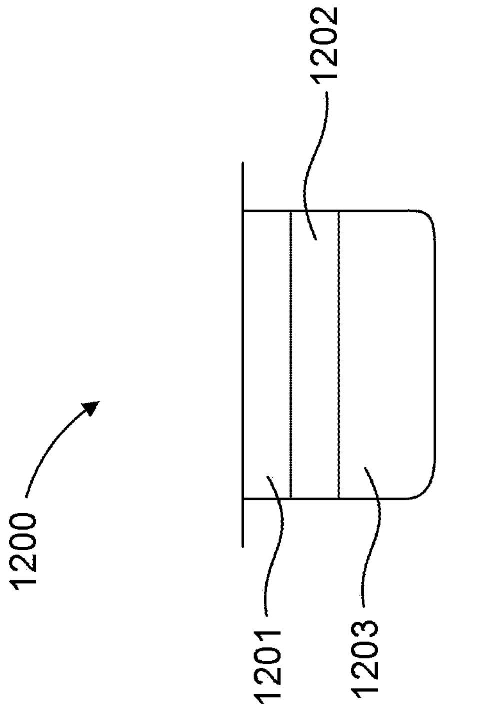
Figure 12C:
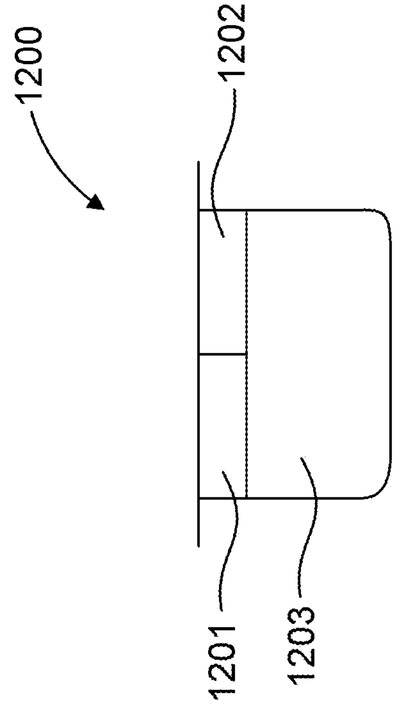

As shown in FIGS. 12A-12D, the pouch may contain significant deviations from two layers. FIG. 12A shows side view of an exemplary configuration of pouch 1200 comprising three horizontal layers, 1201, 1202, and 1203. FIG. 12B shows a side view of another exemplary configuration of pouch 1200 comprising three vertical layers 1201, 1202, and 1203. FIG. 12C shows a side view of another exemplary configuration of pouch 1200 comprising two top layers 1201 and 1202, and one bottom layer 1203. In some embodiments, layer 1201 is one of a gel, a solid powder, or a liquid. In some embodiments, layer 1202 is one of a gel, a solid powder, or a liquid. In some embodiments, layer 1203 is one of a gel, a solid powder, or a liquid. In some embodiments, layer 1201 is a gel, layer 1202 is a solid powder, and layer 1203 is a gel. In some embodiments, layer 1201 is a gel, layer 1202 is a gel, and layer 1203 is a gel.

Pouch 1200 may have more than three layers. For example, as shown FIG. 12D, pouch 1200 has four layers 1201, 1202, 1203, and 1204. In some embodiments, layer 1204 is one of a gel, a solid powder, or a liquid.

Figure 13:
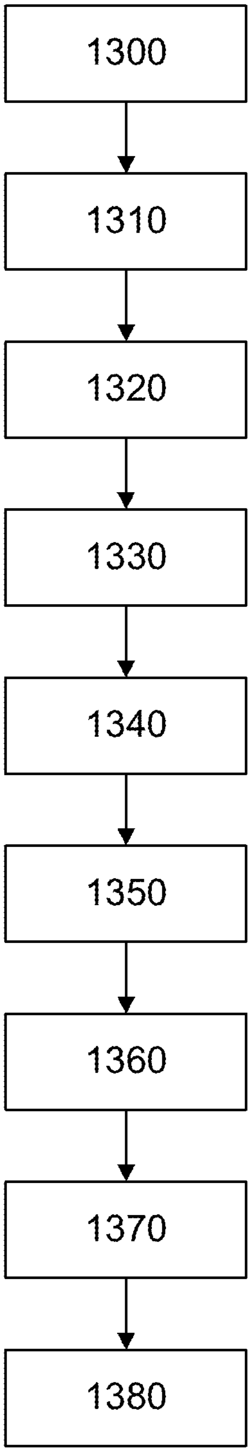
FIG. 13 shows a flow chart for an exemplary process for making a unit-dose detergent product with supercooled liquid to form a gel.

FIG. 13 shows a flow chart for an exemplary method of producing a unit-dose capsule including at least one gel. At step 1300, a first film may be wetted. At step 1310, the first film may be formed into the shape of a first cavity. At step 1320, a first component may be supercooled. In some embodiments, the first component is supercooled to a temperature at which the equilibrium state of the first component is a gel. At step 1330, the first component may be dispensed into the first cavity while the first component is in a supercooled state. In some embodiments, at step 1330, the first component gels to form at least one layer of gel adhered to and/or in contact with the film. Optionally, one or more additional gel layers may be applied over or adjacent to the first component. At step 1340, a second film may be formed into the shape of a second cavity. At step 1350, a second component may be dispensed into the second cavity. At step 1360, the first film and the second film may be sealed together to form a sealed cavity. In some embodiments, the sealed cavity has one chamber containing both the first component and the second component. In some embodiments, the sealed cavity has more than one chamber. At step 1370, the first film may be treated to form perforations in the film. Optionally, at step 1380, a vacuum is applied to the sealed cavity to remove excess gas from the pouch and ensure separation between the components is maintained.

Figure 14:
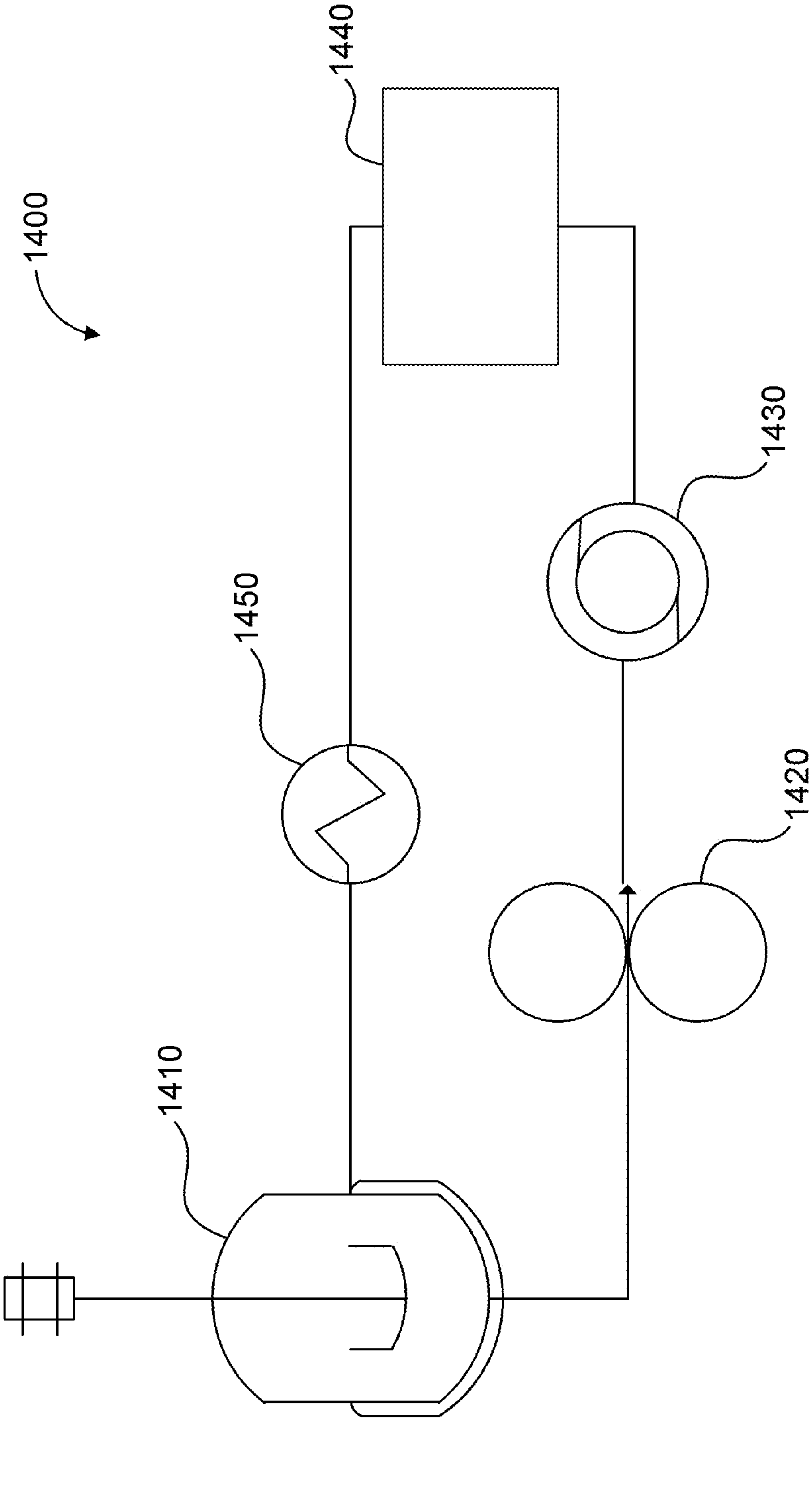
FIG. 14 shows a schematic for an exemplary apparatus for making a unit-dose detergent product with supercooled liquid to form a gel.

FIG. 14 shows a schematic for an exemplary apparatus for making a unit-dose detergent product with supercooled liquid to form a gel. Apparatus 1400 comprises stirred buffer tank 1410, mass flow controller 1420, cooling heat exchanger or votator 1430, filler 1440, and re-heat heat exchanger or votator 1450. In some embodiments, mass flow controller 1420 is a pump. In some embodiments, an inlet temperature of bulk gel is from 150° F. to 180° F., preferably from 160° F. to 165° F. An outlet temperature depends on the degree of supercooling and nucleate content needed to create the right gel properties. A typical operating zone for the outlet would be 120-130 F for our current gel. In some embodiments, heat exchanger 1410 is used to heat the gel to above its melt point. In some embodiments, votator 1430 supercools the liquid. In some embodiments, a nucleate forms inside votator 1430 as the liquid is supercooled. In some embodiments, the size distribution of the nucleates is controlled by adjusting the temperature differential between the surface of heat exchanger 1410 and votator 1430. Additionally, residence time, rotation of blades in the votator, and temperature difference between the heat exchanger media and the bulk gel may also affects the size distribution of the nucleates.

The time required to complete the supercooling step is dependent on the speed of rotation of the blades within votator 1430. In some embodiments, the rate at which gel solidifies after going from nozzle to cavity during filling process is 0.4 seconds to 0.8 seconds. In some embodiments, the supercooling step is completed in 0.5 seconds. As discussed, a votator is used to create the fluid conditions to enable the rapid solidification.

In some embodiments, a scraped wall heat exchanger is used to control the state of the supercooled liquid. When a hot thermal structurant liquid contacts a very cold wall, a structured film will begin to form. The thermal conductivity of the solid film can be very low due to reduced porosity and increased tortuosity, which can dramatically slow heat transfer rates. In some embodiments, a scraped wall heat exchanger is used to mechanically scrape the film off the wall many times per second, which renews the heat transfer area.

Small crystals may form that are below a minimum critical nucleus size, and these small crystals will dissolve into the melt. Further, as discussed above, faster cooling rates lead to greater degrees of supercooling. Both of these principles apply to a scraped wall heat exchanger. Increased rotation speed will reduce the height of a solid film, thereby decreasing particle size. Increasing the shaft size so that the annular gap is smaller will reduce residence time and increase bulk cooling rates. A scraped wall heat exchanger can operate to produce stable nucleates at the exit. The rheological properties and solidification rates of the product exiting the scraped wall heat exchanger may be controlled by adjusting the volume fraction and particle size distribution of the nucleates. For example, if a softer product is desired, the scraped wall heat exchanger can be used to break down structure with longer exposure times to the blades.

In some embodiments, when used in a continuous process, the scraped wall heat exchanger is kept at a steady-state condition by holding the liquid in a jacketed kettle at a temperature slightly above its equilibrium melt point. In some embodiments, excess product is pumped through the scraped wall heat exchanger to the filler, and a portion of the product is withdrawn at the filler. Remaining product may be reheated to kettle conditions.

As used herein, "room temperature" refers to 25° C.

It may be difficult to directly measure temperature of a supercooled gel, as any measuring apparatus might provide a place for the gel to nucleate and solidify, which would disturb both operation of the system and accurate measurement. In some embodiments, the temperature of system components may be measured at various points, as well as the temperature of the liquid (i.e., cooling media) used to form the gel prior to supercooling. These measurements may be used, possibly in connection with DSC data to calculate supercooled gel temperature at various points in the process.

As used herein, "a," "an," or "the" means one or more unless otherwise specified.

Open terms such as "include," "including," "contain," "containing," and the like mean "comprising."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. For example, the term "about" as used herein, may include the recited number ±10%.

When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about."

The "wt %" refers to the weight percent.

The term "or" can be conjunctive or disjunctive.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for producing a unit-dose capsule for household or industrial cleaning, the unit dose capsule including at least one gel, comprising:

wetting a first film;

forming the first film into the shape of a first cavity;

supercooling a first component to a temperature at which the equilibrium state of the first component is a gel;

dispensing the first component in a supercooled state into the first cavity, such that the first component gels to form at least one layer of gel adhered to and/or in contact with the first film;

forming a second film into the shape of a second cavity;

filling the second cavity with a second component, after wetting the first film, sealing the first film to the second film to form a sealed cavity comprising at least one chamber containing the first component and the second component, and perforating the first film to form perforations from which trapped gases can be released;

wherein:

the unit-dose capsule comprises the sealed cavity, the first component and the second component;

at room temperature, the first component is a gel; and the first and second films are water soluble.

2. The method of claim 1, wherein:

the first film is perforated after sealing;

the first film is not perforated in a first region defined by the at least one layer of gel; and the first film is perforated in a second region defined by the area of the first film that is 10 to 100 microns distant from the first region.

3. The method of claim 1, wherein the perforating a first film comprises laser perforation.

4. The method of claim 1, wherein the first component is dispensed into the first cavity after wetting the first film.

5. The method of claim 1, wherein, when the first component is dispensed into the first cavity, the first component is supercooled to a temperature 5° F. to 50° F. below the freezing temperature of the gel.

6. The method of claim 1, wherein, when the first component is dispensed into the first cavity, the first component is supercooled to a temperature 20° F. to 30° F. below the freezing temperature of the gel.

7. The method of claim 1, wherein, the first component is dispensed into the first cavity, the first component is supercooled to a temperature of 125° F. to 200° F.

8. The method of claim 1, wherein the supercooling step is completed within 0.4 seconds to 0.8 seconds.

9. The method of claim 1, wherein the perforating the first film step is completed within 0.5 to 1.0 seconds following the dispensing step.

10. The method of claim 1, wherein the supercooling of the first component is performed in a votator.

11. The method of claim 1, further comprising forming a second layer of gel over the first layer of gel or forming a second layer of gel adjacent to the first layer of gel.

12. The method of claim 11, wherein the second layer of gel comprises a third component different from the first and second components.

13. The method of claim 1, wherein the method comprises a continuous process, a batch process, or a semi-batch process.

* * * * *